United States Patent Office 2,814,582
Patented Nov. 26, 1957

2,814,582

METHOD AND HYDRAZINE COMPOSITIONS FOR TREATING PLANTS

Johannes Thomas Hackmann, Amsterdam, Netherlands, assignor to Shell Development Company, Emeryville, Calif., a corporation of Delaware No Drawing. Application January 28, 1954,
Serial No. 406,874

Claims priority, application Germany January 8, 1952

8 Claims. (Cl. 167—22)

This invention relates to a method and to compositions for treating plants to prevent their destruction by pests, particularly parasitic pathogens, such as fungi, bacteria, and the like.

In accordance with the present invention, it has now been found that acyl hydrazines wherein each acyl radical present is the residue of a monocarboxylic acid, particularly an aliphatic monocarboxylic acid, are especially effective for use in protecting plants from destruction by pests. The preferred compounds for use in the invention are the water-soluble substituted hydrazines having as the only substituents one to two acyl radicals, each acyl radical present being the residue of a monocarboxylic acid.

Water-soluble mono- and dialkanoyl hydrazines, wherein each alkanoyl radical present contains not more than about 7 carbon atoms, are particularly suitable for use in the invention.

The preferred compounds of the invention can be represented by the following general structural formula:

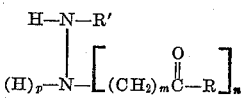

wherein R represent —H, —OH or an organic radical, preferably an aliphatic radical; $m$ is an integer of from 0 to 4; R' is the hydrogen atom or

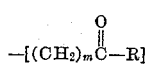

where $m$ and R have the same meanings as already stated; $n$ is an integer from 1 to 2 and is 1 when R' is not hydrogen; and $p$ is an integer from 0 to 1. In the above formula, R is preferably an alkyl group of not more than about 6 carbon atoms and $m$ is preferably 0.

Typical acyl hydrazines which can be employed in accordance with the present invention are the aliphatic acyl hydrazines such as N-acetyl hydrazine; N-formyl hydrazine; N,N'-diacetyl hydrazine; N,N'-diformyl hydrazine; N,N-diacetyl hydrazine; N,N'-dipropionyl hydrazine; N-butyryl hydrazine; N,N'-diisobutyryl hydrazine; N-cyanoacetyl hydrazine; N-(betacyanopropionyl)-hydrazine; N,N'-di-n-valeryl hydrazine; N-isovaleryl hydrazine; N-caproyl hydrazine; N,N'-dicaproyl hydrazine; hydrazine-N,N-diformic acid; hydrazine-N,N-diacetic acid; hydrazine-N,N'-formic acid; hydrazine-N,N'-diacetic acid; hydrazine-N,N'-dipropionic acid; hydrazine-N,N'-dibutyric acid; and the like, and cycloaliphatic acyl hydrazines such as cyclopentane carboxylic acid hydrazide; cyclohexane carboxylic acid hydrazide; methylcyclopentane carboxylic acid hydrazides; and the like.

Many of the compounds of the present invention have a systemic action; that is, they penetrate into the plants through which they spread, thereby rendering the plants immune or at least less susceptible to the attack of pests. Usually, the immunity lasts a few weeks, for instance, three weeks, after the substances have been absorbed by the plants. In many cases, the toxic agents have a curative effect if the plants are already effected. In many instances, such parts of the plants as develop after application of the systemic toxicant, such as new shoots, blades, flowers, fruits, etc., become immune for a certain period of time. Although the mechanism behind this systemic action is not clearly understood, it is believed that the systemic toxicants are converted to some other products within the living plants, the immunity and/or recovery being caused only by certain conversion products.

A systemic toxicant should be rapidly taken up by the plant; hence, the more water-soluble toxicants are preferred. In this application, solubility in water denotes a solubility of at least about 0.01% by weight at ambient temperatures. Solubility in water is known, generally, to decrease as the number of carbon atoms in the molecule increases. Therefore, acyl hydrazines having not more than about 9 carbon atoms per molecule are generally preferred.

The acyl hydrazines of the invention which contain free carboxylic acid groups, such as hydrazine-N,N'-diacetic acid, can be employed, if desired, in the form of their salts, particularly their sodium, potassium, and ammonium salts.

The hydrazine derivatives of this invention, being basic nitrogen compounds, can also form salts with acids, and they are preferably used in the form of such salts. Particularly suitable salts are those formed with the inorganic mineral acids, such as hydrochloric acid, sulfuric acid, phosphoric acid, pyrophosphoric acid, etc. Salts of acyl hydrazines with organic acids can also be employed.

The hydrazine derivatives need not be employed in a pure condition. Inactive materials in admixtures which have been formed in the commercial preparation thereof can be present. Mixtures of the toxic compound as can be readily prepared from commercial products are also suitable.

The pesticidal agents of the invention can be used alone or in combination with other fungicidal, viricidal, insecticidal or acaricidal materials, the action of which may be either internal or external, with plant nutritives, with plant hormones, and the like. Wetting agents and, if necessary or desirable, stickers can be present. Any conventional wetting agent, for example, alkyl sulfate salts, alkyl aryl sulfonate salts, sulfosuccinate salts, ethers from polyethylene glycols and alkylated phenols, and the like can be employed. If the pesticidal agents are employed in the form of emulsions or suspensions, for example, in water, solvents such as oils, emulsifiers, emulsion stabilizers, and the like can be added. Materials which suppress the phytotoxic action of the pesticides, thereby making it possible to utilize unusually high dosages of the pesticidal material, can also be present. For example, glucose is known to protect tomato plants against damage by certain substances having a phytotoxic effect when in concentrated form, such as urea.

The pesticidal agents of the present invention can be effectively applied to the plant in various ways, as by (a) contacting parts of the plants above or in the soil therewith, (b) contacting the seed therewith, (c) introducing the agents into the soil near the roots of the plants, or (d) direct introduction of the agents into the plants, for example, through holes or incisions in parts of the plants. Application to parts of the plants above the soil by means of spraying has proved to be a particularly satisfactory method. When introducing the agents into the soil, care should be taken that the agents are introduced as near to the roots as possible and that sufficiently high concentrations be absorbed by the components of the soil since the agents might undergo a chemical or microbiological conversion before penetrating into the plants.

Spraying of the plants to be treated is preferably performed with aqueous solutions or suspensions containing an effective toxic amount of the pesticidal agent. Aqueous solutions or suspensions containing from about 0.01 to about 5% by weight, and preferably from about 0.1 to about 1% by weight, of the pesticidal agent are particularly suitable. Higher concentrations of the fungicidal agents can be employed if no phytotoxic effects are observed. As a rule, however, because of the danger of phytotoxicity, the use of low concentrations is recommended. If desired, a minor amount, of the order of from about 0.01 to about 0.05% by weight, of a wetting agent can be added to aid in forming a suspension of the active agent in the aqueous medium. Any of the conventional wetting agents, such as those mentioned above, can be employed. A particularly suitable wetting agent is the sodium salt of a mixture of secondary heptadecyl sulfates, sold commercially under the name of "Teepol." It is generally advantageous to add to the composition a suitable sticker to prevent the acyl hydrazine employed from being washed off the plants by rain. Suitable stickers include heavy, substantially paraffinic mineral oils, carboxymethyl cellulose, gelatin, dichromate gelatin, sodium silicate, and the like. If a mineral oil is employed, it should have an unsulfonatable residue above about 80% w., and preferably above 90% w., in order to insure safety from phytotoxic activity.

The substituted hydrazines are particularly effective for protecting plants from the attack of parasitic pathogens, some of the more important of which are listed in Table I.

TABLE I

| Latin name of the pathogen | English name of the disease | Most important plants on which the disease may occur |
| --- | --- | --- |
| Cladosporium fulvum | Leaf mould (tomato disease). | Tomato plants. |
| Septoria apii graveolentis | | Celery plants. |
| Phytophthora infestans | Late blight (potato disease). | Potato plants. |
| Colletotrichum lindemuthianum. | Anthracnose | Brown kidney bean plants (Phaseolus vulgaris L.). |
| Exobasidium vexans | Blister blight | Tea plants. |
| Erysiphaceae (various species). | Mildew | Various plants, e. g., apple trees. |
| Uredinales (various species). | Rust | Corn species. |
| Fusarium (various species). | Wilt disease | Cucumber plants. |
| Ceratostomella ulmi | Dutch elm disease | Elm trees. |
| Pseudomonas (various species e. g., Agrobacterium tumefaciens). | Crown gall | Tomato and many other plants. |

All of the pathogens mentioned in the foregoing table are fungi, except the last which is a species of bacteria.

The activity of the toxic compounds of the present invention was, in general, determined by the following method:

Test plants were sprayed with an aqueous solution of the agent until the liquid dropped from the leaves. After the spray liquid dried, usually after about two days, the plants were exposed to contamination. In all cases, a part of the test plant was also treated prior to contamination, with artificial rain consisting of tap water containing about 0.2% by weight of "Teepol" in order to completely remove the spray liquid from the surface of the leaves of the plants.

Depending on the kind of test plant and of the kind of fungus, contamination was effected either by inoculation of the plant or by placing the plant in contaminated surroundings, for example, in a greenhouse in which plants affected by the fungus were present. Conditions were such that the untreated plants soon became diseased. After a certain period had elapsed, depending on the plant tested, the ratio of the affected leaf surface to the total leaf surface was determined for both the treated and the untreated plants. The quantity obtained by subtracting the quotient of these two numbers from one is a measure for the degree to which suppression of the pathogen has succeeded. Hereinafter, this quantity, expressed in percent, will be termed the degree of suppression. The degree of suppression was determined at a time at which the untreated plants showed clear symptoms of the disease. As a rule, the leaf surfaces were not measured, but estimated with the required accuracy. An experienced person can in this way determine the degree of suppression with an accuracy of about 5%. This accuracy is sufficient since, in general, results obtained in biological tests are only reproducible within rather wide limits.

The invention is illustrated by the following examples which are not to be construed as limiting the specification and claims in any manner:

Example I

Two month old tomato plants were sprayed with a 0.3% w. aqueous solution of N-acetyl hydrazine until the liquid dripped from the leaves. Two days later the plants were moved to a greenhouse heavily infested with Cladosporium fulvum, where they remained 17 days. The degree of suppresison of the disease was found to be 95%.

The above test was carried out with each of the following: a 0.3% w. aqueous solution of N,N'-diacetyl hydrazine; a 0.2% w. aqueous solution of N,N'-diacetyl hydrazine; and a 0.1% w. aqueous solution of N-acetyl hydrazine, and the degree of suppression was found to be 95%, 80%, and 80%, respectively.

Example II

A field planted with young tea plants in a region heavily infested by blister blight, was sprayed with a 0.6% w. aqueous solution of N-acetyl hydrazine. A degree of suppression of 100% was observed.

Example III

Celery plants (20 cm. high) were sprayed with a 0.5% w. aqueous solution of palmitoyl hydrazine, 100 cc. of spraying liquid being applied per square meter. After two days, the plants were placed in a moist greenhouse and inoculated with spores of Septoria apii graveolentis. After three weeks, the degree of suppression was observed to be 52%. Presumably, this lower activity is due to the relatively higher molecular weight and the relatively low water-solubility of this compound.

Example IV

Cyclohexane carboxylic acid hydrazide was tested for its effectiveness against Septoria apii graveolentis by the same method as described in Example III, using a 0.2% w. aqueous solution of the active agent. The degree of suppression was observed to be 79%.

Example V

Of six three-year old elm trees (about 2 meters high, variety hollandica), which were planted in concrete troughs containing 1 cum. of earth, two trees were bored in the trunk to the core. A rubber tubule, which was connected to a small storage vessel containing a 0.02% w. aqueous solution of N,N'-diacetyl hydrazine, was introduced into the borehole (3 mm. in diameter). Within two days, the solution was completely absorbed by the plant. Two days after the end of the absorption period, the trees were inoculated at the trunk with a suspension of spores of some races of Ceratostomella ulmi.

With two other trees, 2 liters of a 0.1% w. aqueous solution of N,N'-diacetyl hydrazine were injected into the soil around the roots to a depth of 50 cm., while 23 liters of the same solution were poured out upon the soil. Four days later, the trees treated in this manner, as well as the trees left untreated, were inoculated with the disease.

Six weeks after the inoculation, the untreated trees showed clear symptoms of Dutch elm disease, whereas all of the treated trees were unaffected.

Example VI

Fourteen day-old brown kidney bean plants wtih two leaves were sprayed with a 0.5% w. aqueous solution of hydrazine-N,N-diacetic acid. Two days later the plants were inoculated with spores of *Colletotrichum lindemuthianum*. After 14 days, a degree of suppression of 100% was observed.

Example VII

Two months old tomato plants, affected with Agrobacterium tumefaciens, were smeared with a 0.3% w. aqueous solution of N,N'-diacetyl hydrazine in the places where tumors were observed. After 3 weeks, the tumors had completely disappeared.

Example VIII

An aqueous solution of 1% by weight of cyanoacetyl hydrazine was sprayed on brown kidney beans which were heavily infested with aphides. One day after spraying all the aphides had been killed.

This application is a continuation-in-part of the copending application of J. T. Hackmann, Serial No. 329,933, filed January 6, 1953, now abandoned.

I claim as my invention:

1. A fungicidal composition comprising a hydrazine having the structural formula

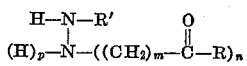

wherein R is chosen from the group consisting of hydrogen, hydroxyl and aliphatic radicals; $m$ is an integer ranging between 0 and 4; R' is chosen from the group consisting of hydrogen and

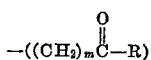

radicals wherein R is chosen from the group consisting of hydrogen, hydroxyl and aliphatic radicals, and $m$ is an integer ranging between 0 and 4; $n$ is an integer ranging between 1 and 2; and $p$ is an integer ranging between 0 and 1; and a surface-active wetting agent suitable for dispersing said composition in an aqueous medium.

2. A fungicidal composition comprising N-N'-diacetyl hydrazine, and a surface-active wetting agent suitable for dispersing said composition in an aqueous medium.

3. A fungicidal composition comprising N-acetyl hydrazine and a surface-active wetting agent suitable for dispersing said composition in an aqueous medium.

4. The method of combating fungi and bacteria which comprises applying to growing plants subject to attack by said fungi and said bacteria a fungicidal and bactericidal amount of a hydrazine having the structural formula

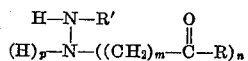

wherein R is chosen from the group consisting of hydrogen, hydroxyl and aliphatic radicals; $m$ is an integer ranging between 0 and 4; R' is chosen from the group consisting of hydrogen and

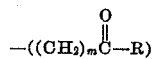

radicals wherein R is chosen from the group consisting of hydrogen, hydroxyl and aliphatic radicals, and $m$ is an integer ranging between 0 and 4; $n$ is an integer ranging between 1 and 2; and $p$ is an integer ranging between 0 and 1.

5. The method of combating fungi and bacteria which comprises applying to growing plants subject to attack by said fungi and said bacteria a fungicidal and bactericidal amount of N-N'-diacetyl hydrazine.

6. The method of combating fungi and bacteria which comprises applying to growing plants subject to attack by said fungi and said bacteria a fungicidal and bactericidal amount of N-acetyl hydrazine.

7. The method of combating fungi and bacteria which comprises applying to growing plants subject to attack by said fungi and said bacteria a fungicidal and bactericidal amount of N-cyanoacetyl hydrazine.

8. The method of combating fungi and bacteria which comprises applying to growing plants subject to attack by said fungi and said bacteria a fungicidal and bactericidal amount of hydrazine-N,N-diacetic acid.

References Cited in the file of this patent

UNITED STATES PATENTS 2,654,689  Ligett _____ Oct. 6, 1953

OTHER REFERENCES

Bushland: Journ. of Econ. Entomology, vol. 33 (1940), pp. 669–676.

Chemical Abstracts, 1953, p. 3929a.

Juin: Annales de l' Institut Pasteur, vol. 72, 1946, pp. 580 and 590.